United States Patent [19]
Bajracharya et al.

[11] Patent Number: 6,001,405
[45] Date of Patent: Dec. 14, 1999

[54] PREPARATION OF SHELF-STABLE FILLED PASTAS

[75] Inventors: Rupak Bajracharya, Newtown; George Cherian; Louise Barbara Wyant, both of New Milford, all of Conn.

[73] Assignee: Nestec S. A., Vevey, Switzerland

[21] Appl. No.: 08/917,311

[22] Filed: Aug. 25, 1997

[51] Int. Cl.$^6$ .............................. A23L 1/162; A23L 1/16
[52] U.S. Cl. .................. 426/325; 426/324; 426/326; 426/275; 426/297; 426/94; 426/557
[58] Field of Search ................. 426/94, 557, 324–326, 426/275, 297

[56] References Cited

U.S. PATENT DOCUMENTS

| | | | |
|---|---|---|---|
| 3,655,401 | 4/1972 | Halik | 426/557 |
| 3,694,233 | 9/1972 | Kaplow et al. | 426/324 |
| 3,922,353 | 11/1975 | Bernotavicr | 426/94 |
| 4,049,835 | 9/1977 | Haas et al. | 426/326 |
| 4,054,674 | 10/1977 | Barker et al. | 426/326 |
| 4,529,609 | 7/1985 | Guarneri | 426/557 |
| 4,597,976 | 7/1986 | Duster et al. | 426/557 |
| 4,659,576 | 4/1987 | Dahle et al. | 426/557 |
| 4,734,291 | 3/1988 | Raffensperger | 426/325 |
| 4,741,911 | 5/1988 | McIntyre et al. | 426/325 |
| 4,828,852 | 5/1989 | Hsu et al. | 426/94 |
| 4,898,744 | 2/1990 | Liggett et al. | 426/94 |
| 4,915,966 | 4/1990 | Guaeneri | 426/557 |
| 5,057,330 | 10/1991 | Lee et al. | 426/324 |
| 5,059,433 | 10/1991 | Lee et al. | 426/94 |
| 5,332,587 | 7/1994 | Howard et al. | 426/557 |
| 5,562,938 | 10/1996 | Lee et al. | 426/324 |
| 5,695,801 | 12/1997 | Oh | 426/325 |

FOREIGN PATENT DOCUMENTS

| | | | |
|---|---|---|---|
| 6261-37 | 11/1994 | European Pat. Off. | 426/557 |
| 54-41340 | 4/1979 | Japan | 426/557 |
| 57-16623 | 4/1982 | Japan | 426/557 |
| 60-259154 | 12/1985 | Japan | 426/557 |
| 64-85048 | 3/1989 | Japan | 426/557 |
| 5-15331 | 1/1993 | Japan | 426/557 |
| WO95/04472 | 2/1995 | WIPO | 426/557 |

OTHER PUBLICATIONS

Fourth Int. Conf. on Controlled Mod. ATM. Vac. Pack. (Castelvetri) (Dialog Abstract), 1989.
Intil Conf. Unmod. ATM. Packaging (Castel Vetri) (Dialog Abstract), 1990.
Rass, Dell. Imballagid vol. 15, No. 8 G pp. 28–30, 32–34 (Dialog Abstract), Apr. 1994.
Technica Molitoria v. 46 (5) pp. 449–464 (Dialog Abstract), May 1995.
Technica Molitoria v. 46 (6) pp. 577–586 (Dialog Abstract), Jun. 1995.
Meat Science 38(2) 341–346 (Dialog Abstract), 1994.
Industria Conserve, 61(4) 333–337 (Dialog Abstract), 1986.
Fleischwirt Schaft 1994 74(6) 639–640 643–646 (Dialog Abstract), 1994.
Sustainability Directorate, US Army p. 64, 1995.
Food Formulating 2(9) 41–48, 1996.
Bundesanstalt Fver Fleischforschung pp. 120–137, 1976.

*Primary Examiner*—Steven Weinstein
*Attorney, Agent, or Firm*—Pennie & Edmonds LLP

[57] ABSTRACT

A process for the production of a pre-cooked, high moisture, shelf-stable or refrigerated, acidified filled pasta comprising a filling within a dough skin which comprises mixing pasta ingredients together to form a pasta dough, forming the dough into a sheet suitable to form the skin of the filled pasta, encasing a filling having a water activity of less than 0.93 and a pH of above 4.6 within the dough sheet to give a raw filled pasta, cooking the raw filled pasta in acidified water to a pH of above 4.6 to a moisture content of from 55 to 70% by weight, partially drying to achieve a moisture content of from 40 to 55% and a water activity of less than 0.93, and finally packaging the cooked pasta either with heat processing or under modified atmospheric conditions.

12 Claims, No Drawings

PREPARATION OF SHELF-STABLE FILLED PASTAS

FIELD OF THE INVENTION

The present invention relates to the preparation of filled pastas and more particularly to the preparation of pre-cooked, high moisture, shelf-stable or refrigerated, acidified filled pasta products.

BACKGROUND OF THE INVENTION

Traditionally, shelf-stable or refrigerated pre-cooked/acidified regular pastas (e.g. spaghetti, linguine, penne, etc.) are prepared by boiling pastas (raw/wet or dried) in acidified water, coating with oil followed by packaging and heat processing with steam or boiling water (for example, a product temperature of 90°–95° C. for about 10–20 minutes). In some cases, the pasta products are sterilized at higher temperatures (for example 104° C.) using a shorter processing time. The cooked pasta usually has a moisture content of from about 55 to 70% by weight. Various kinds of acids and combinants are used in the pasta acidification process as a hurdle to ensure microbiological stability to obtain a pH typically between 3.9 to 4.6, preferably from 4.1 to 4.5 and more preferably from 4.2 to 4.4.

However, acid perception is commonly recognized in the acidified pasta. In the case of filled pasta products such as ravioli, tortellini, etc., most fillings accentuate the acidic notes and the product tends to become almost inedible at a pH lower than 4.6. Although a higher pH would render the taste of a filled pasta more acceptable, it may not ensure shelf stability.

SUMMARY OF THE INVENTION

We have developed a process for the preparation of pre-cooked, high moisture, shelf-stable or refrigerated, acidified filled pasta products in which the combined water activity is less than 0.93 and the combined moisture content is less than 55%, a shelf-stable pasta having a pH up to 5.2 may be obtained with an acceptable taste. The filled pasta of the present invention is not a "ready to eat" pasta but it requires a short period of cooking and rehydration for consumption.

Accordingly, the present invention provides a process for the production of a pre-cooked, high moisture, shelf-stable or refrigerated, acidified filled pasta comprising a filling within a dough skin which comprises mixing pasta ingredients together to form a pasta dough, sheeting the dough to a sheet having a pH above 4.6 suitable to form the skin of the filled pasta, encasing a filling having a water activity of less than 0.93 and a pH of above 4.6 within the dough sheet to give a raw filled pasta, cooking the raw filled pasta in acidified water to a pH of above 4.6 to a moisture content of from 55 to 70% by weight, partially drying to achieve a moisture content of from 40 to 55% and a water activity of less than 0.93, and finally packaging the blanched pasta either with heat processing or under modified atmospheric conditions.

DETAILED DESCRIPTION OF THE PREFERRED EMBODIMENTS

The pasta dough may be prepared from a farinaceous ingredient and water, with or without one or more additives. The farinaceous ingredient may be one or more of durum semolina, rice flour, buckwheat flour, durum flour, regular wheat flour, whole wheat flour, farine flour, or corn flour, or any mixture thereof. Generally, durum or wheat flour are preferred. The farinaceous ingredient is usually present in an amount of from 70 to 95% of the dry ingredient mixture, with amounts of between 80–90% by weight of the dry mix being preferred. The amount of water present in the dough is normally from 15 to 35% by weight based on the total weight of the dough.

Wheat gluten or corn gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks and/or liquid whole eggs, may if desired, be included in the ingredient mix at levels up to about 22% by weight of the dry ingredient mix. In addition, glyceryl monostearate may, if desired, also be included in the ingredient mix. If used, the glyceryl monostearate preferably is present in amounts of from 0.5 to 5% by weight of the dry ingredient mix. It is to be understood that wheat gluten, eggs, and glyceryl monostearate are optional ingredients in the dry mix and are not essential in the production of the pasta component.

If desired, colorants, seasonings, spices or flavourings such as meat, chicken or beef flavors may be added to the pasta dough, e.g. in amounts of from 0.1 to 5% by weight based on the total weight of the pasta.

The pasta dough may be formed into a sheet by sheeting or extrusion. The pasta dough is preferably sheeted to a thickness of from about 0.03 to 0.07 inches, preferably from 0.04 to 0.06 inches. The pH of the pasta dough sheet may be as high as 5.5 and preferably from 4.8 to 5.3. If desired, the dough sheet may be acidified to a pH of less than 5.3 by boiling, dipping or spraying in acid or by adding to the dough ingredients before sheeting. Examples of acids which may be used are food acceptable acids including organic acids such as lactic, fumaric, malic acid or gluconic acid lactone.

The filling may be any desired filling for use in a filled pasta, e.g. a conventional filling such as a cheese filling, a meat filling, a vegetable filling or a tomato-based filling. The pH of the pasta filling may be as high as 5.5, preferably from 4.8 to 5.3 and especially from 4.9 to 5.2. To obtain a pH of less than 5.3, it may be necessary to acidify the filling. Examples of acids which may be used are food acceptable acids such as lactic, fumaric, malic acid or gluconic acid lactone. The pH of the filling is preferably from 4.8 to 5.2.

After encasing the filling within the dough sheet to give a raw filled pasta, the seams where the edges of the dough sheet meet are preferably sealed, e.g. by coating with an egg wash.

The raw filled pasta is cooked in acidified water to obtain a moisture content of 55 to 70% for from about 3 to 15 minutes, preferably from 4 to 9 minutes. The pasta can be cooked in acidified water by different methods, e.g. hot water, steam/water spraying, etc. In a continuous operation, it will be cooked in a blancher with steam/water using acidified water. Examples of acids which may be used are food acceptable acids such as lactic, fumaric, malic acid or gluconic acid lactone. The acid concentration is preferably from about 0.1 to 1.0%, especially from 0.2 to 0.75% by weight. The pH of the cooked pasta may be as high as 5.5, preferably from 4.8 to 5.3 and especially from 4.9 to 5.2.

The partial drying of the cooked pasta may be achieved by the use of a humectant or by heat, but preferably by a combination of both humectant and heat. The humectant may be added before, during or after the application of heat.

The heat may be provided by hot air blowers, a hot air impingement oven, a stationery drier or infrared heaters. The temperature of the partial drying may be from about 80° to 200° C. for from about 0.5 to 30 minutes, preferably from 100° to 150° C. for 5 to 20 minutes, longer periods of time usually being used for lower temperatures.

The humectant that is used should, of course, be edible and is preferably used in a solution. The humectant may be salt, glycerol, sorbitol, etc. Mixtures of two or more humectants may be used if desired and this may improve the sensory quality. Advantageously, salt (sodium chloride) is used either as the sole humectant or as part of a mixture of humectants. The cooked pasta may conveniently be dipped in an aqueous solution of the humectant for a few seconds, e.g. from about 1 to 60 seconds and preferably from 5 to 20 seconds. Although longer periods may be used, there is usually no advantage obtained. The concentration of the humectant in the aqueous solution may be from about 1 to 25%, preferably from 2.5 to 20% and especially from 5 to 15% by weight.

Cooking the raw filled pasta to a moisture content of from 55 to 70% by weight, and partially drying to a moisture content of from 40 to 55%, preferably from 40 to 50%, is necessary to obtain the desirable water activity for shelf life, to gelatinize the starch and also to facilitate rehydration during the reheating prior to consumption.

Before packaging, the pastas are advantageously coated with edible oil to inhibit sticking. The oil may advantageously be coated onto the pasta by spraying. The oil should have a melting point below 40° C., preferably below 35° C. and is advantageously a vegetable oil, e.g. soybean oil, peanut oil, olive oil, sunflower oil, safflower oil, canola oil or any combination thereof. The amount of oil coated onto the pasta may be from about 0.5 to 8%, preferably from 1 to 5% and especially from 1.5 to 3% by weight based on the weight of the pasta.

The pastas are finally packaged in suitable containers, e.g. cans, glass jars or plastics pouches. After sealing, the containers may be heat processed to pasteurize the product and render it shelf-stable. In accordance with the present invention, the containers may be heat processed under atmospheric conditions which provide a sterilizing value equivalent to 10 minutes at 93° C. For example, a commercially pasteurized product may be produced by processing the sealed containers for from about 10–20 minutes in hot water or steam at about 90°–95° C. Upon completion of heat processing, the containers are rapidly cooled to a temperature of about 45° C. or below in order to preserve the texture of the products.

Alternatively, after sealing, the pastas are pasteurized under modified atmospheric condition. The modified atmosphere may comprise nitrogen alone or a mixture of nitrogen and carbon dioxide as is conventionally used, e.g. a ratio of $N_2$ to $CO_2$ of 80:20, 65:35 or 50:50.

The filled pastas produced by the process of the present invention are shelf stable over periods of four weeks or longer and have excellent organoleptic qualities.

EXAMPLE

The following Example further illustrates the present invention. Parts and percentages are given by weight unless otherwise stated.

Example 1

A pasta dough is prepared by mixing 65 parts durum flour, 12 parts liquid whole egg and 23 parts water. This pasta dough is sheeted to a thickness of 0.05 inches, and a bolognese sauce filling acidified to a pH of 5.0 and having a water activity less than 0.93 is encased between the dough sheet. The seams where the edges of the dough sheet meet are sealed by coating with an egg wash to give a raw ravioli. The raw ravioli is cooked in boiling water containing 0.425% by weight lactic acid for 8 minutes to a moisture content of 70%. The product is then dipped in salt solution (10%) for 10 seconds and then partially dried by passing through an air impingement oven at 130° C. for 12 minutes to a moisture content of 45%. The product is cooled and then coated with 1% by weight of olive oil based on the weight of the pasta. Afterwards, the product is packaged under modified atmosphere (100% nitrogen) and then in-pack pasteurized (IPP) at 97° C. for 30 minutes. The pouch is then cooled and held at room temperature. The water activity of the final product undergoes changes between the dough skin and the filling and thermodynamic equilibrium is achieved within 7 days to give a water activity of <0.93 and a pH of <5.0. Microbiological analysis of the product stored at room temperatureafter 37 days showed good stability as follows:

Total plate count<100

Lactic acid bacteria<100

Yeast and mold<100

B. Cereus<100

Coliforms/E. Coli<100

In order to prepare the product for consumption, it is reheated in boiling water for 3 minutes after which the moisture content of the dough skin is about 65%.

We claim:

1. A process for the production of a pre-cooked, high moisture, shelf-stable or refrigerated, acidified filled pasta having a filling within a dough skin which comprises mixing pasta ingredients together to form a pasta dough having a pH above 4.6 and up to 5.5, forming the dough into a sheet suitable to form the skin of the filled pasta, encasing a filling having a water activity of less than 0.93 and a pH above 4.6 and up to 5.5 within the dough sheet to give a raw filled pasta, cooking the raw filled pasta in acidified water to obtain a pH of the cooked pasta, above 4.6 and up to 5.5 and a moisture content of the cooked pasta of from 55 to 70% by weight, partially drying the cooked pasta to achieve a moisture content of the cooked pasta of 40 to 55% and a water activity of the cooked pasta of less than 0.93, and finally packaging the cooked pasta either with heat processing to pasteurize the packaged pasta or under modified atmospheric conditions such that the pH, moisture content and water activity of the cooked pasta product along with said packaging results in a filled pasta that is shelf stable and can be stored either at room temperature or under refrigeration.

2. A process according to claim 1 wherein the pasta dough is formed into a sheet by sheeting or extrusion.

3. A process according to claim 1 wherein the pasta dough is sheeted to a thickness of from 0.03 to 0.07 inches.

4. A process according to claim 1 wherein the filling is a cheese filling, a meat filling, a vegetable filling or a tomato-based filling.

5. A process according to claim 1 wherein to obtain a pH of less than 5.3, the filling is acidified.

6. A process according to claim 1 wherein the pH of the filling is from 4.8 to 5.2.

7. A process according to claim 1 wherein the raw filled pasta is cooked in acidified water to obtain a moisture content of 55 to 70% for from 3 to 15 minutes.

8. A process according to claim 1 wherein the acid used is lactic, fumaric, malic acid or gluconic acid lactone.

9. A process according to claim 1 wherein the the partial drying of the cooked pasta is achieved by the use of a humectant or by heat or a combination of both humectant and heat.

10. A process according to claim 9 wherein the humectant is salt, glycerol, sorbitol or any mixture of two or more humectants containing sodium chloride.

11. A process according to claim 1 wherein the partial drying of the cooked pasta is achieved by hot air blowers, a hot air impingement oven or infrared heaters.

12. A process according to claim 11 wherein the temperature of the partial drying is from about 80° to 200° C. for from about 0.5 to 30 minutes.

* * * * *